United States Patent
Zobel et al.

(10) Patent No.: US 7,235,598 B1
(45) Date of Patent: *Jun. 26, 2007

(54) POLYCARBONATE MOULDING MATERIALS WITH ANTI-STATIC PROPERTIES

(75) Inventors: Michael Zobel, Köln (DE); Thomas Eckel, Dormagen (DE); Dieter Wittmann, Leverkusen (DE); Bernd Keller, Geldern (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/890,148

(22) PCT Filed: Jan. 24, 2000

(86) PCT No.: PCT/EP00/00515

§ 371 (c)(1),
(2), (4) Date: Aug. 27, 2001

(87) PCT Pub. No.: WO00/46285

PCT Pub. Date: Aug. 10, 2000

(30) Foreign Application Priority Data

Feb. 4, 1999 (DE) ................................ 199 04 392

(51) Int. Cl.
*C08K 3/10* (2006.01)
*C08L 69/00* (2006.01)

(52) U.S. Cl. ........................................ 524/437; 524/430

(58) Field of Classification Search ................ 524/437
See application file for complete search history.

(56) References Cited

U.S. PATENT DOCUMENTS

| | | | | |
|---|---|---|---|---|
| 3,130,177 A | * | 4/1964 | Grabowski | ................... 525/67 |
| 4,450,255 A | * | 5/1984 | Baney | ........................ 524/430 |
| 4,666,912 A | | 5/1987 | Mészáros et al. | ........... 514/258 |
| 4,937,285 A | | 6/1990 | Wittmann et al. | ............ 525/67 |
| 4,983,658 A | | 1/1991 | Kress et al. | ................. 524/141 |
| 5,030,675 A | | 7/1991 | Wittmann et al. | .......... 524/130 |
| 5,204,394 A | | 4/1993 | Gosens et al. | .............. 524/125 |
| 5,274,017 A | | 12/1993 | Pan | ............................. 524/162 |
| 5,455,292 A | | 10/1995 | Kakegawa et al. | ......... 524/141 |
| 5,849,827 A | * | 12/1998 | Bodiger et al. | ............. 524/423 |
| 5,908,663 A | * | 6/1999 | Wang | ......................... 427/322 |
| 6,083,428 A | | 7/2000 | Ueda et al. | ................. 252/609 |
| 6,093,759 A | | 7/2000 | Gareiss et al. | .............. 524/122 |
| 6,444,735 B1 | * | 9/2002 | Eckel et al. | ................. 524/127 |
| 6,569,930 B1 | * | 5/2003 | Eckel et al. | ................. 524/127 |

FOREIGN PATENT DOCUMENTS

| | | | |
|---|---|---|---|
| DE | 19530200 | * | 2/1997 |
| EP | 0 107 015 | | 5/1984 |
| EP | 0 728 811 | | 8/1996 |
| EP | 0 767 204 | | 4/1997 |
| JP | 59-202240 | | 11/1984 |

OTHER PUBLICATIONS

Kirk-Othmer "Concise Encyclopedia of Chemical Technology" 1990; p. 79.*
Patent Abstracts of Japan, vol. 013, No. 273 (C-609), Jun. 22, 1989, & JP 01 066271 A (Kanebo Ltd), Mar. 13, 1989.
Patent Abstracts of Japan, vol. No. 457 (P-1597) & JP 05 101446 A (Ricoh Co. Ltd.) Apr. 23, 1993.

* cited by examiner

*Primary Examiner*—David J. Buttner
(74) *Attorney, Agent, or Firm*—Joseph C. Gil; Lyndanne M. Whalen; John E. Mrozinski, Jr.

(57) ABSTRACT

A thermoplastic molding compositions comprising thermoplastic polycarbonate and an additive amount of an aluminum compound is disclosed. The aluminum compound is characterized by its particle size and the composition is characterized by its improved anti-static properties.

5 Claims, No Drawings

POLYCARBONATE MOULDING MATERIALS WITH ANTI-STATIC PROPERTIES

FIELD OF THE INVENTION

The present invention relates to polycarbonate moulding compositions which comprise aluminium compounds and have improved mechanical properties and an improved antistatic action.

BACKGROUND OF THE INVENTION

Thermoplastic moulding compositions, in particular those which comprise homo- and/or copolymers of one or more ethylenically unsaturated monomers, polycarbonates and polyesters, are known from a large number of publications. This particularly applies to the use of ABS polymers. Reference is made to the following documents merely by way of example: DE-A-19616, WO 97/40092, EP-A-728811, EP-A-315868 (=U.S. Pat. No. 4,937,285), EP-A 0174493 (U.S. Pat. No. 4,983,658), U.S. Pat. No. 5,030,675, JA 59202240, EP-A 0363608 (=U.S. Pat. No. 5,204,394), EP-A 0767204, EP-A 0611798, WO 96/27600 and EP-A 0754.

The thermoplastic moulding compositions described in this prior art are still in need of improvement in their mechanical properties. This particularly applies to the use of these moulding compositions in safety-relevant components, e.g. in the motor vehicle industry, where high requirements are imposed on elongation at break, ESC properties, notched impact strength, heat distortion point and processability.

The antistatic action of the known moulding compositions also still requires improvement.

DETAILED DESCRIPTION OF THE INVENTION

Surprisingly, it has now been found that polycarbonate moulding compositions have an antistatic action and improved mechanical properties if aluminium compounds are added to them.

The invention accordingly provides thermoplastic moulding compositions comprising thermoplastic polycarbonate and 0.01 to 30, preferably 0.01–20, particularly preferably 0.01–10 parts by wt. per 100 parts by wt. (polycarbonate) of aluminium compounds having an average particle diameter of 1 nm–20 μm, preferably 1 nm–10 μm, particularly preferably 5–500 nm and especially preferably 5–200 nm.

The invention in particular provides thermoplastic moulding compositions comprising A. 40 to 99 parts by wt., preferably 50 to 95 parts by wt., particularly preferably 60 to 90 parts by wt. of an aromatic polycarbonate, B. 0 to 50, preferably 1 to 30 parts by wt. of a vinyl (co)polymer of at least one monomer chosen from the series consisting of styrene, α-methylstyrene, styrenes substituted on the nucleus, $C_1$–$C_8$-alkyl methacrylates and $C_1$–$C_8$-alkyl acrylates with at least one monomer from the series consisting of acrylonitrile, methacrylonitrile, $C_1$–$C_8$-alkyl methacrylates, $C_1$–$C_8$-alkyl acrylates, maleic anhydride and N-substituted maleimides, C. 0.5 to 60 parts by wt., preferably 1 to 40 parts by wt., particularly preferably 2 to 30 parts by wt. of a graft polymer comprising at least two monomers from the group consisting of mono- or polyunsaturated olefins, such as e.g. ethylene, propylene, chloroprene, butadiene and isoprene, vinyl acetate, styrene, α-methylstyrene, styrenes substituted on the nucleus, vinyl cyanides, such as e.g. acrylonitrile and methacrylonitrile, maleic anhydride and N-substituted maleimides, D. 0.01 to 30 parts by wt., preferably 0.01 to 20 parts by wt., particularly preferably 0.01 to 10 parts by wt. of aluminium compounds having an average particle diameter of 1 nm–20 μm, preferably 1 nm–10 μm, particularly preferably 5–500 nm and especially preferably 5–200 mm.

The sum of all the parts by weight of A+B+C+D gives 100.

Each of the components mentioned can also be used as mixture.

Component A

Thermoplastic aromatic polycarbonates according to component A which are suitable according to the invention are those based on diphenols of the formula (I)

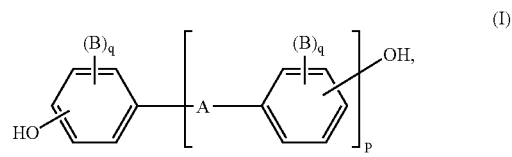

wherein

A is a single bond, $C_1$–$C_5$-alkylene, $C_2$–$C_5$-alkylidene, $C_5$–$C_6$-cycloalkylidene, —S— or —SO$_2$—, B is chlorine or bromine, q is 0, 1 or 2 and p is 1 or 0, or alkyl-substituted dihydroxyphenylcycloalkanes of the formula (II)

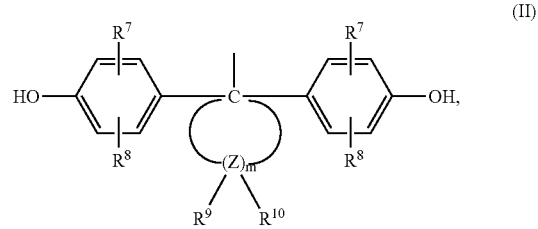

wherein $R^7$ and $R^8$ independently of one another each denote hydrogen, halogen, preferably chlorine or bromine, $C_1$–$C_8$-alkyl, $C_5$–$C_6$-cycloalkyl, $C_6$–$C_{10}$-aryl, preferably phenyl, and $C_7$–$C_{12}$-aralkyl, preferably phenyl-$C_1$–$C_4$-alkyl, in particular benzyl, m denotes an integer of 4, 5, 6 or 7, preferably 4 or 5, $R^9$ and $R^{10}$ can be chosen individually for each Z and independently of one another denote hydrogen or $C_1$–$C_6$-alkyl, and Z denotes carbon, with the proviso that on at least one atom Z $R^9$ and $R^{10}$ simultaneously denote alkyl.

Suitable diphenols of the formula (I) are e.g. hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane and 2,2-bis-(3,5-dibromo-4-hydroxyphenyl)-propane.

Preferred diphenols of the formula (I) are 2,2-bis-(4-hydroxyphenyl)-propane, 2,2-bis-(3,5-dichloro-4-hydroxyphenyl)-propane and 1,1-bis-(4-hydroxyphenyl)-cyclohexane.

Preferred diphenols of the formula (II) are 1,1-bis-(4-hydroxyphenyl)-3,3-dimethyl-cyclohexane, 1,1-bis-(4-hydroxyphenyl)-3,3,5-trimethylcyclohexane and 1,1-bis-(4-hydroxyphenyl)-2,4,4-trimethyl-cyclopentane.

Polycarbonates which are suitable according to the invention are both homopolycarbonates and copolycarbonates.

Component A can also be a mixture of the thermoplastic polycarbonates defined above.

Polycarbonates can be prepared in a known manner from diphenols with phosgene by the phase boundary process or with phosgene by the process in a homogeneous phase, the so-called pyridine process, it being possible for the molecular weight to be adjusted in a known manner by a corresponding amount of known chain stoppers.

Suitable chain stoppers are e.g. phenol, p-chlorophenol, p-tert-butylphenol or 2,4,6-tribromophenol, and also long-chain alkylphenols, such as 4-(1,3-tetramethylbutyl)-phenol, in accordance with DE-OS 2842005, or monoalkylphenols or dialkylphenols having a total of 8 to 20 C atoms in the alkyl substituents, in accordance with German Patent Application P 3506472.2, such as 3,5-di-tert-butylphenol, p-iso-octylphenol, p-tert-octylphenol, p-dodecylphenol and 2-(3,5-dimethyl-heptyl)-phenol and 4-(3,5-dimethyl-heptyl)-phenol.

The amount of chain stoppers is in general between 0.5 and 10 mol %, based on the sum of the particular diphenols of the formulae (I) and/or (II) employed.

Polycarbonates A which are suitable according to the invention have average molecular weights ($\overline{M}_w$ weight-average, measured e.g. by ultracentrifugation or scattered light measurement) of 10,000 to 200,000, preferably 20,000 to 80,000.

Polycarbonates A which are suitable according to the invention can be branched in a known manner, and in particular preferably by incorporation of 0.05 to 2 mol %, based on the sum of the diphenols employed, of compounds which are trifunctional or more than trifunctional, e.g. those having three or more than three phenolic groups.

Preferred polycarbonates are, in addition to bisphenol A homopolycarbonate, the copolycarbonates of bisphenol A with up to 15 mol %, based on the molar sum of diphenols, of 2,2-bis-(3,5-dibromo-4-hydroxyphenyl)-propane and the copolycarbonates of bisphenol A with up to 60 mol %, based on the molar sum of diphenols, of 1,1-bis-(4-hydroxyphenyl)-3,3,5-trimethylcyclohexane.

Polycarbonates A can be replaced in part or completely by aromatic polyester carbonates. The aromatic polycarbonates of component A can also contain polysiloxane blocks. The preparation thereof is described, for example, in DE-OS 3334872 and in U.S. Pat. No. 3,821,325.

Component B

Vinyl (co)polymers according to component B which can be employed according to the invention are those of at least one monomer from the series consisting of: styrene, α-methylstyrene and/or styrenes substituted on the nucleus, $C_1$–$C_8$-alkyl methacrylate and $C_1$–$C_8$-alkyl acrylate with at least one monomer from the series consisting of: acrylonitrile, methacrylonitrile, $C_1$–$C_8$-alkyl methacrylate, $C_1$–$C_8$-alkyl acrylate, maleic anhydride and/or N-substituted maleimides (B.2).

$C_1$–$C_8$-Alkyl acrylates and $C_1$–$C_8$-alkyl methacrylates are esters of acrylic acid and methacrylic acid respectively and monohydric alcohols having 1 to 8 C atoms. Methyl, ethyl and propyl methacrylate are particularly preferred. Methyl methacrylate is mentioned as a particularly preferred methacrylic acid ester.

Thermoplastic (co)polymers having a composition according to component B can be formed as a by-product during the grafting polymerization for the preparation of component C, especially if large amounts of monomers are grafted on to small amounts of rubber. The amount of (co)polymer B to be employed according to the invention does not include these by-products of the grafting polymerization.

(Co)polymers according to component B are resinous, thermoplastic and rubber-free.

Particularly preferred (co)polymers B are those of styrene (B1) with acrylonitrile and optionally with methyl methacrylate (B2), of α-methylstyrene (B1) with acrylonitrile and optionally with methyl methacrylate (B2), or of styrene (B1) and α-methylstyrene with acrylonitrile and optionally with methyl methacrylate (B2).

Thermoplastic (co)polymers B comprise 50 to 99, preferably 60 to 95 parts by wt. B.1 and 50 to 2, preferably 40 to 5 parts by wt. B.2.

The styrene/acrylonitrile copolymers according to component B are known and can be prepared by free-radical polymerization, in particular by emulsion, suspension, solution or bulk polymerization. The copolymers according to component B preferably have molecular weights $\overline{M}_w$ (weight-average, determined by light scattering or sedimentation) of between 15,000 and 200,000.

Particularly preferred copolymers B according to the invention are also randomly built-up copolymers of styrene and maleic anhydride, which can be prepared from the corresponding monomers by a continuous bulk or solution polymerization with incomplete conversions.

The contents of the two components of the randomly built-up styrene/maleic anhydride copolymers which are suitable according to the invention can be varied within wide limits. The preferred content of maleic anhydride is 5 to 25 wt. %.

The molecular weights (number-average $\overline{M}_n$) of the randomly built-up styrene/maleic anhydride copolymers according to component B which are suitable according to the invention can vary over a wide range. The range from 60,000 to 200,000 is preferred. A limiting viscosity of 0.3 to 0.9 (measured in dimethylformamide at 25° C.; in this context see Hoffmann, Krömer, Kuhn, Polymeranalytik I, Stuttgart 1977, page 316 et seq.) is preferred for these products.

Instead of styrene, vinyl (co)polymers B can also comprise styrenes which are substituted on the nucleus, such as p-methylstyrene, vinyltoluene and 2,4-dimethylstyrene, and other substituted styrenes, such as α-methylstyrene, which can optionally be halogenated.

Component C

Graft polymers C comprise e.g. graft copolymers with rubber-elastic properties which are substantially obtainable from at least two of the following monomers: chloroprene, 1,3-butadiene, isoprene, styrene, acrylonitrile, ethylene, propylene, vinyl acetate and (meth)-acrylic acid esters having 1 to 18 C atoms in the alcohol component; that is to say polymers such as are described e.g. in "Methoden der Organischen Chemie" (Houben-Weyl), vol. 14/1, Georg Thieme-Verlag, Stuttgart 1961, p. 393–406 and in C. B. Bucknall, "Toughened Plastics", Appl. Science Publishers, London 1977. Preferred polymers C are partly crosslinked and have gel contents of more than 20 wt. %, preferably more than 40 wt. %, in particular more than 60 wt. %.

Preferred graft polymers C include graft polymers of:
C.1 5 to 95, preferably 30 to 80 parts by wt. of a mixture of C.1.1 50 to 95 parts by wt. styrene, α-methylstyrene, styrene substituted on the nucleus by halogen or methyl, $C_1$–$C_8$-alkyl methacrylate, in particular methyl methacrylate, or $C_1$–$C_8$-alkyl acrylate, in particular methyl methacrylate, or mixtures of these compounds and C.1.2 5 to 50 parts by wt. acrylonitrile, methacrylonitrile, $C_1$–$C_8$-alkyl methacrylate, in particular methyl methacrylate, $C_1$–$C_1$-alkyl acrylate, in particular methyl acrylate, maleic anhydride or $C_1$–$C_4$-alkyl- or phenyl-N-substituted maleimides, or mixtures of these compounds, on C.2 5 to 95, preferably 20 to 70 parts by wt. polymer having a glass transition temperature below –10° C.

Preferred graft polymers C are e.g. polybutadienes, butadiene/styrene copolymers and acrylate rubbers grafted with styrene and/or acrylonitrile and/or (meth)acrylic acid alkyl esters; i.e. copolymers of the type described in DE-OS 1694173 (=U.S. Pat. No. 3,564,077); and polybutadienes, butadiene/styrene or butadiene/acrylonitrile copolymers, polyisobutenes or polyisoprenes grafted with acrylic or methacrylic acid alkyl esters, vinyl acetate, acrylonitrile, styrene and/or alkylstyrenes, such as are described e.g. in DE-OS 2348377 (=U.S. Pat. No. 3,919,353).

Particularly preferred polymers C are e.g. ABS polymers, such as are described e.g. in DE-OS 2035390 (=U.S. Pat. No. 3,644,574) or in DE-OS 2248242 (=GB B 1409275).

Particularly preferred graft polymers C are graft polymers which are obtainable by a grafting reaction of I. 10 to 70, preferably 15 to 50, in particular 20 to 40 wt. %, based on the graft product, of at least one (meth)acrylic acid ester or 10 to 70, preferably 15 to 50, in particular 20 to 40 wt. % of a mixture of 10 to 50, preferably 20 to 35 wt. %, based on the mixture, of acrylonitrile or (meth) acrylic acid ester and 50 to 90, preferably 65 to 80 wt. %, based on the mixture, of styrene on II. 30 to 90, preferably 50 to 85, in particular 60 to 80 wt. %, based on the graft product, of a butadiene polymer with at least 50 wt. %, based on II, of butadiene radicals as the graft base, wherein the gel content of graft base 11 is preferably at least 20 wt. %, particularly preferably at least 40 wt. % (measured in toluene), the degree of grafting G is 0.15 to 0.55 and the average particle diameter $d_{50}$ of the graft polymer is 0.05 to 2 μm, preferably 0.1 to 0.6 μm.

(Meth)acrylic acid esters I are esters of acrylic acid or methacrylic acid and monohydric alcohols having 1 to 18 C atoms. Methyl, ethyl and propyl methacrylate are particularly preferred.

In addition to butadiene radicals, graft base II can contain up to 50 wt. %, based on II, of radicals of other ethylenically unsaturated monomers, such as styrene, acrylonitrile, esters of acrylic or methacrylic acid having 1 to 4 C atoms in the alcohol component (such as methyl acrylate, ethyl acrylate, methyl methacrylate and ethyl methacrylate), vinyl esters and/or vinyl ethers. The preferred graft base II comprises pure polybutadiene.

The degree of grafting G designates the weight ratio of grafted-on grafting monomer to graft base and has no dimensions.

The average particle size $d_{50}$ is the diameter above and below which in each case 50 wt. % of the particles lie. It can be determined by means of ultracentrifuge measurement (W. Scholtan, H. Lange, Kolloid, Z. und Z. Polymere 250 (1972), 782–796).

Particularly preferred polymers C are e.g. also graft polymers of (a) 20 to 90 wt. %, based on C, of acrylate rubber having a glass transition temperature below –20° C. as the graft base and (b) 10 to 80 wt. %, based on C, of at least one polymerizable, ethylenically unsaturated monomer (cf. C.1) as the grafting monomer.

The acrylate rubbers (a) of polymers C are preferably polymers of acrylic acid alkyl esters, optionally with up to 40 wt. %, based on (a), of other polymerizable, ethylenically unsaturated monomers. Preferred polymerizable acrylic acid esters include $C_1$–$C_8$-alkyl esters, for example the methyl, ethyl, butyl, n-octyl and 2-ethylhexyl esters; halogenoalkyl esters, preferably halogeno-$C_1$–$C_8$-alkyl esters, such as chloro ethyl acrylate, and mixtures of these monomers.

For crosslinking, monomers having more than one polymerizable double bond can be copolymerized. Preferred examples of crosslinking monomers are esters of unsaturated mono carboxylic acids having 3 to 8 C atoms and unsaturated monohydric alcohols having 3 to 12 C atoms or saturated polyols having 2 to 4 OH groups and 2 to 20 C atoms, such as e.g. ethylene glycol dimethacrylate and allyl methacrylate; polyunsaturated heterocyclic compounds, such as e.g. trivinyl and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds which contain at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine and triallylbenzenes.

The amount of crosslinking monomers is preferably 0.02 to 5, in particular 0.05 to 2 wt. %, based on graft base (a).

With cyclic crosslinking monomers having at least 3 ethylenically unsaturated groups, it is advantageous to limit the amount to less than 1 wt. % of graft base (a).

Preferred "other" polymerizable, ethylenically unsaturated monomers which can optionally be used, in addition to the acrylic acid esters, for the preparation of graft base (a) are e.g. acrylonitrile, styrene, α-methylstyrene, acrylamides, vinyl $C_1$–$C_6$-alkyl ethers, methyl methacrylate and butadiene. Preferred acrylate rubbers as graft base (a) are emulsion polymers which have a gel content of at least 60 wt. %.

Further suitable graft bases are silicone rubbers with grafting-active positions such as are described in the Offenlegungsschriften DE-OS 3704657, DE-OS 3704655, DE-OS 3631540 and DE-OS 3631539.

The gel content of graft base (a) is determined at 25° C. in dimethylformamide (M. Hoffmann, H. Krömer, R. Kuhn, Polymeranalytik I und II, Georg Thieme-Verlag, Stuttgart 1977).

Since as is known the grafting monomers are not necessarily grafted completely on to the graft base during the grafting reaction, according to the invention graft polymers C are also to be understood as those products which are obtained by polymerization of the grafting monomers in the presence of the graft base.

Component D

Compounds of aluminium with one or more metals of main groups 1 to 5 and sub-groups 1 to 8 of the periodic table, preferably main groups 2 to 5 and sub-groups 4 to 8, particularly preferably main groups 3 to 5 and sub-groups 4 to 8, or compounds with the elements oxygen, carbon, nitrogen, hydrogen, sulfur and silicon are suitable as component D.

Oxides, water-containing oxides, phosphates, sulfates, sulfides, hydroxides, borates and borophosphates of aluminium can be employed according to the invention. Aluminium oxide hydroxide, aluminium phosphate and aluminium borate are particularly preferred. Aluminium oxide hydroxide is especially preferred.

According to the invention, the particle size is <10 µm, preferably ≧5 µm.

Water-containing compounds such as aluminium oxide hydroxide are preferred.

Particle size and particle diameter always means the average particle diameter $d_{50}$, determined by ultracentrifuge measurements by the method of W. Scholtan et al. Kolloid-Z. und Z. Polymere 250(1972), p. 782 to 796.

The aluminium compounds can be in the form of powders, pastes, sols, dispersions or suspensions. Powders can be obtained by precipitation from dispersions, sols or suspensions.

The powders can be incorporated into the thermoplastics by conventional processes, for example by direct kneading or extrusion of the constituents of the moulding composition and the very fine-particled inorganic powders. Preferred processes are the preparation of a masterbatch, e.g. in flameproofing additives, other additives, monomers, solvents or in component A, or coprecipitation of dispersions of components B or C with dispersions, suspensions, pastes or sols of the very fine-particled inorganic materials.

The moulding compositions according to the invention can comprise conventional additives, such as very fine-particled inorganic compounds, lubricants and mould release agents, nucleating agents, antistatics, stabilizers, fillers and reinforcing materials and dyestuffs and pigments. The processing auxiliaries are added in the conventional amounts.

The inorganic compounds include compounds of one or more metals of main groups 1 to 5 or sub-groups 1 to 8 of the periodic table, preferably main groups 2 to 5 or sub-groups 4 to 8, particularly preferably main groups 3 to 5 or sub-groups 4 to 8, with the elements oxygen, sulfur, boron, phosphorus, carbon, nitrogen, hydrogen and/or silicon.

Preferred compounds are, for example, oxides, hydroxides, water-containing oxides, sulfates, sulfites, sulfides, carbonates, carbides, nitrates, nitrites, nitrides, borates, silicates, phosphates, hydrides, phosphites or phosphonates.

Preferred very fine-particled inorganic compounds are, for example, TiN, $TiO_2$, $SnO_2$, WC, ZnO, $ZrO_2$, $Sb_2O_3$, $SiO_2$, iron oxides, $NaSO_4$, $BaSO_4$, vanadium oxides, zinc borate and silicates, such as Al silicates, Mg silicates and one-, two- and three-dimensional silicates. Mixtures and doped compounds can also be used. Furthermore, these nanoscale particles can also be surface-modified with organic molecules in order to achieve a better compatibility with the polymers. Hydrophobic or hydrophilic surfaces can be generated in this manner.

The average particle diameters are less than 200 nm, preferably less than 150 nm, in particular 1 to 100 nm.

Particle size and particle diameter always means the average particle diameter $d_{50}$, determined by ultracentrifuge measurements by the method of W. Scholtan et al. Kolloid-Z. und Z. Polymere 250 (1972), p. 782 to 796.

The inorganic compounds can be in the form of powders, pastes, sols, dispersions or suspensions. Powders can be obtained by precipitation from dispersions, sols or suspensions.

The moulding compositions can comprise up to 25 parts by wt. (based on the total moulding composition) of inorganic compounds.

The powders can be incorporated into the thermoplastics by conventional processes, for example by direct kneading or extrusion of the constituents of the moulding composition and the very fine-particled inorganic powders. Preferred processes are the preparation of a masterbatch, e.g. in flameproofing additives, other additives, monomers, solvents or in component A, or coprecipitation of dispersions of components B or C with dispersions, suspensions, pastes or sols of the very fine-particled inorganic materials.

The thermoplastic moulding compositions can comprise inorganic fillers and reinforcing materials, such as glass fibres, optionally cut or ground, glass beads, glass balls, reinforcing material in platelet form, such as kaolin, talc, mica, silicates, quartz, talc, titanium dioxide, wollastonite, mica, carbon fibres or mixtures thereof. Cut or ground glass fibres are preferably employed as the reinforcing material.

Preferred fillers, which can also have a reinforcing action, are glass beads, mica, silicates, quartz, talc, titanium dioxide and wollastonite.

The moulding compositions with a filler or reinforcing material content can comprise up to 60, preferably 10 to 40 wt. %, based on the moulding composition with a filler or reinforcing material content, of fillers and/or reinforcing substances.

The moulding compositions according to the invention are prepared by mixing the particular constituents in a known manner and subjecting the mixture to melt compounding or melt extrusion at temperatures of 200° C. to 300° C. in conventional units, such as internal kneaders, extruders and twin-screw extruders, the fluorinated polyolefins preferably being employed in the form of the coagulated mixture already mentioned.

The individual constituents can be mixed in a known manner both successively and simultaneously, and in particular both at about 20° C. (room temperature) and at a higher temperature.

The moulding compositions of the present invention can be used for the production of all types of shaped articles. In particular, shaped articles can be produced by injection moulding. Examples of shaped articles which can be produced are: housing components of all types, e.g. for domestic appliances, such as juice presses, coffee machines and mixers, or for office machines, such as computers, printers and monitors, or covering sheets for the building sector and components for the motor vehicle sector. They are moreover employed in the field of electrical engineering, because they have very good electrical properties.

The moulding compositions are particularly suitable for the production of thin-walled mouldings (e.g. data technology housing components), where particularly high requirements are imposed on the notched impact strength and stress-cracking resistance of the plastics employed.

Another form of processing is the production of shaped articles by blow moulding or by thermoforming from previously produced sheets or films.

EXAMPLES

Component A

Polycarbonate based on bisphenol A with a relative solution viscosity of 1.252, measured in methylene chloride at 25° C. and in a concentration of 0.5 g/100 ml.

Component B

Styrene/acrylonitrile copolymer with a styrene/acrylonitrile ratio of 72:28 and a limiting viscosity of 0.55 dl/g (measurement in dimethylformamide at 20° C.).

Component C

Graft polymer of 40 parts by wt. styrene and acrylonitrile in a ratio of 73:27 on 60 parts by wt. crosslinked polybutadiene rubber in particle form (average particle diameter $d_{50}=0.3$ μm), prepared by emulsion polymerization.

Component D

Pural 200, an aluminium oxide hydroxide (Condea, Hamburg, Germany) is employed as the inorganic compound. The average particle size of the material is approx. 20–40 nm.

Preparation and Testing of the Moulding Compositions According to the Invention

Components A to D are mixed on a 3 l internal kneader. The shaped articles are produced on an injection moulding machine type Arburg 270E at 260° C.

The tensile E modulus is measured in accordance with the method of ISO 527.

The elongation at break DR is determined in the context of the determination of the tensile E modulus in accordance with the method of ISO 527 on F3 dumbbell bars.

The antistatic action is determined by a dust figure test. For this circular sheets are charged statically with a cotton cloth and then dusted with aluminium powder. The evaluation is visual.

The Vicat B heat distortion point is determined in accordance with DIN 53460.

The composition of the materials tested and the data obtained are summarized in the following table 1.

TABLE 1

| Examples | 1 Comparison | 2 |
|---|---|---|
| Components: [%] | | |
| A | 42.60 | 42.18 |
| B | 32.70 | 32.38 |
| C | 23.80 | 23.57 |
| D | – | 0.99 |
| Additives (processing auxiliaries) | 0.90 | 0.88 |

TABLE 1-continued

| Examples | 1 Comparison | 2 |
|---|---|---|
| Properties: | | |
| Vicat B 120 [° C.] | 111 | 111 |
| Dust figure test | – | + |
| Tensile E modulus [N/mm$^2$] | 1,982 | 2,143 |
| Elongation at break [%] | 44.6 | 62.5 |
| MUR (260° C./5 kg) [ccm/10 min] | 8.3 | 12.2 |
| $a_k$ Izod 260° C./23° C. [kJ/m$^2$] | 61.9 | 66.6 |

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

The invention claimed is:

1. A thermoplastic molding composition consisting of:
   40 to 99 parts by wt. aromatic polycarbonate;
   1 to 30 parts by wt. vinyl copolymer;
   0.5 to 60 parts by wt. graft polymer;
   0.1 to 30 parts by wt. of an aluminum oxide hydroxide having an average particle diameter of 1 nm–20 μm; and
   at least one additive selected from the group consisting of stabilizers, pigments, mold release agents, flow auxiliaries antistatics, fillers, reinforcing materials and inorganic compounds.

2. The thermoplastic molding composition according to claim 1, wherein the average particle diameter of the compound is 1 nm–10 μm.

3. The thermoplastic molding composition according to claim 1, wherein the average particle diameter of the compound is 5–500 nm.

4. In a method of producing a molded article, the improvement comprising including the thermoplastic molding composition of claim 1.

5. The molded article prepared by the method of claim 4.

* * * * *